US012784631B2

(12) United States Patent
Park et al.

(10) Patent No.: US 12,784,631 B2
(45) Date of Patent: Nov. 3, 2026

(54) DISPLAY DEVICE HAVING DRIVING CONTROLLER CAPABLE OF COMPENSATING INPUT IMAGE DATA BASED ON PANEL STRUCTURE, METHOD OF DRIVING THE DISPLAY DEVICE, AND ELECTRONIC DEVICE INCLUDING THE DISPLAY DEVICE

(71) Applicant: SAMSUNG DISPLAY CO., LTD., Yongin-si (KR)

(72) Inventors: Min-Kyu Park, Yongin-si (KR); Dong-Hwan Lee, Yongin-si (KR); Sangeun Choi, Yongin-si (KR); Hyunsuk Roh, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/172,738

(22) Filed: Apr. 8, 2025

(65) Prior Publication Data

US 2026/0038409 A1 Feb. 5, 2026

(30) Foreign Application Priority Data

Jul. 31, 2024 (KR) ........................ 10-2024-0101417

(51) Int. Cl.
*G09G 3/20* (2006.01)

(52) U.S. Cl.
CPC ..... *G09G 3/2007* (2013.01); *G09G 2310/027* (2013.01); *G09G 2310/0291* (2013.01); *G09G 2320/0233* (2013.01); *G09G 2320/0242* (2013.01); *G09G 2320/0285* (2013.01)

(58) Field of Classification Search
CPC ........... G09G 3/2007; G09G 2310/027; G09G 2310/0291; G09G 2320/0233; G09G 2320/0242; G09G 2320/0285; G09G 3/2092; G09G 3/3685; G09G 3/20; G09G 3/3291; G09G 3/3688; G09G 3/3677; G09G 3/3266; G09G 3/3233; G09G 3/3648
See application file for complete search history.

(56) References Cited

U.S. PATENT DOCUMENTS

| | | | | |
|---|---|---|---|---|
| 9,396,694 B2 | 7/2016 | Ahn et al. | | |
| 2003/0179170 A1* | 9/2003 | Lee | G09G 3/3648 | 345/87 |
| 2009/0225105 A1* | 9/2009 | Park | G09G 3/3688 | 345/690 |

(Continued)

FOREIGN PATENT DOCUMENTS

| | | |
|---|---|---|
| KR | 10-2145391 B1 | 8/2020 |
| KR | 10-2549895 B1 | 7/2023 |
| KR | 10-2580221 B1 | 9/2023 |

*Primary Examiner* — Richard J Hong
(74) *Attorney, Agent, or Firm* — F. CHAU & ASSOCIATES, LLC

(57) ABSTRACT

A display device includes a display panel including data lines and pixels connected to the data lines, a data driver configured to provide a data voltage to the data lines through output buffers, and a driving controller configured to generate a data signal based on input image data to provide the data signal to the data driver. The driving controller compensates for the input image data based on a panel structure which is a connection structure of the data lines, the output buffers, and the pixels.

20 Claims, 19 Drawing Sheets

(56) References Cited

U.S. PATENT DOCUMENTS

| | | | | |
|---|---|---|---|---|
| 2014/0232713 | A1* | 8/2014 | Hsu | G09G 3/3685<br>345/99 |
| 2017/0047016 | A1* | 2/2017 | Son | G09G 3/20 |
| 2017/0076663 | A1* | 3/2017 | Nishimura | G09G 3/3266 |
| 2020/0111405 | A1* | 4/2020 | Kim | G09G 3/2092 |
| 2021/0035518 | A1* | 2/2021 | Yabuki | G09G 3/3677 |
| 2022/0051606 | A1* | 2/2022 | Kim | G09G 3/2007 |
| 2023/0138436 | A1* | 5/2023 | Lee | G09G 3/3233<br>345/55 |
| 2023/0215384 | A1* | 7/2023 | Kim | G09G 3/3233<br>345/690 |
| 2024/0153425 | A1* | 5/2024 | Kwon | G09G 3/20 |
| 2024/0194143 | A1* | 6/2024 | Kim | G09G 3/3688 |
| 2025/0118267 | A1* | 4/2025 | Sang | G09G 3/3291 |

* cited by examiner

FIG. 18

LUT_SF

| SF | | IMG[N-1] | | | | | |
|---|---|---|---|---|---|---|---|
| | | 0 | 8 | 16 | 24 | 32 | 40 |
| IMG[N] | 0 | 0 | | | | | |
| | 16 | 1 | 0.87 | 0 | | | |
| | 32 | 1 | 0.87 | 0.34 | 0.07 | 0 | |
| | 64 | 1 | 0.48 | 0.34 | 0.23 | 0.18 | 0.18 |
| | 96 | 1 | 0.48 | 0.45 | 0.31 | 0.19 | 0.19 |

DISPLAY DEVICE HAVING DRIVING CONTROLLER CAPABLE OF COMPENSATING INPUT IMAGE DATA BASED ON PANEL STRUCTURE, METHOD OF DRIVING THE DISPLAY DEVICE, AND ELECTRONIC DEVICE INCLUDING THE DISPLAY DEVICE

CROSS-REFERENCE TO RELATED APPLICATION(S)

This U.S. patent application claims priority under 35 USC § 119 to Korean Patent Application No. 10-2024-0101417 filed on Jul. 31, 2024 in the Korean Intellectual Property Office (KIPO), the disclosure of which is incorporated by reference in its entirety herein.

TECHNICAL FIELD

Embodiments of the present inventive concept are directed to a pixel, a display device, a method of driving the display device, and an electronic device including the display device to prevent visible stains.

DISCUSSION OF RELATED ART

In general, a display device includes a display panel and a display panel driver. The display panel displays an image based on input image data and includes gate lines, data lines, and pixels. The display panel driver includes a gate driver which provides a gate signal to the gate lines, a data driver which provides a data voltage to the data lines, and a driving controller which controls the gate driver and the data driver.

When the distance between the gate driver and the pixel is large, the gate signal may experience a delay. Similarly, a longer distance between the data driver and the pixel can result in a delay of the data voltage. Therefore, as the display panel size increases, both the gate signal delay and the data voltage delay may increase.

In addition, as a driving frequency of the display panel increases, a frame period may become shorter. As the driving frequency increases, delays in the gate signal or the data voltage can lead to an insufficient pixel charging rate, preventing the pixel from reaching its target luminance. When the display device operates with dynamic pattern data containing varying grayscale levels for the pixels, the difference between the target luminance and the actual luminance may be perceived by a user as a stain. The stain may appear as uneven brightness or discoloration, making the display look inconsistent.

SUMMARY

Embodiments of the present inventive concept provide a display device which does not show a stain even when driven by dynamic pattern data.

Embodiments of the present inventive concept provide a method of driving the display device.

Embodiments of the present inventive concept provide an electronic device including the display device.

In an embodiment of a display device according to the present inventive concept, the display device includes a display panel, a data driver and a driving controller. The display panel includes data lines and pixels connected to the data lines, a data driver configured to provide a data voltage to the data lines through output buffers, and a driving controller configured to generate a data signal based on input image data to provide the data signal to the data driver. The driving controller compensates for the input image data based on a panel structure which is a connection structure of the data lines, the output buffers, and the pixels.

In an embodiment, the driving controller may select previous data and current data from the input image data based on the panel structure, may generate spatial compensation data based on the panel structure and the current data, may generate a scaling factor based on the previous data and the current data, and may compensate for the current data based on the spatial compensation data and the scaling factor.

In an embodiment, the output buffer may sequentially output a previous data voltage corresponding to the previous data and a current data voltage corresponding to the current data, and the previous data voltage and the current data voltage may be sequentially provided to a previous pixel and a current pixel included in the pixels according to the panel structure.

In an embodiment, the spatial compensation data may be generated based on a worst pattern according to the panel structure.

In an embodiment, when a difference between the grayscale of the previous data and a grayscale of the current data exceeds a predetermined grayscale threshold, a difference between a previous data voltage corresponding to the previous data and a current data voltage corresponding to the current data may exceed a predetermined voltage threshold.

In an embodiment, when a difference between the previous data voltage and the current data voltage exceeds the predetermined voltage threshold, the scaling factor may exceed a predetermined scaling threshold.

In an embodiment, when the grayscale of the previous data is equal to the grayscale of the current data, the scaling factor may be 0.

In an embodiment, the driving controller may scale the spatial compensation data by the scaling factor to generate compensation data, and may add the compensation data to the current data to compensate the current data.

In an embodiment, the display device may further comprise a memory configured to store panel structure data, a spatial lookup table, and a scaling lookup table, and the panel structure data may include an information about the panel structure, the spatial lookup table includes spatial compensation data corresponding to the current data, and the scaling lookup table may include the scaling factor corresponding to the previous data and the current data.

In an embodiment, the driving controller may interpolate the spatial compensation data included in the spatial lookup table to generate interpolated spatial compensation data.

In an embodiment, the driving controller may interpolate the scaling factor included in the scaling lookup table to generate interpolation spatial compensation data.

In an embodiment, the memory may further include a spatial weight.

In an embodiment, the driving controller may include a previous data selector configured to select the previous data and the current data from the input image data based on the panel structure, a spatial compensation data generator configured to generate the spatial compensation data based on the panel structure and the current data, a scaling factor generator configured to generate the scaling factor based on the previous data and the current data, and a adder configured to compensate for the current data based on the scaling factor and the spatial compensation data.

In an embodiment of a method of driving a display device according to the present inventive concept, the method includes compensating for input image data based on a panel structure which is a connection structure of data lines, output buffers, and pixels to generate a data signal, converting the data signal into a data voltage, and providing the data voltage to the data lines through the output buffers.

In an embodiment, compensating for the input image data based on the panel structure to generate the data signal may include selecting previous data and current data from the input image data based on the panel structure, generating spatial compensation data based on the panel structure and the current data, generating a scaling factor based on the previous data and the current data, and compensating for the current data based on the spatial compensation data and the scaling factor to generate the data signal.

In an embodiment, the output buffer may sequentially output a previous data voltage corresponding to the previous data and a current data voltage corresponding to the current data, and the previous data voltage and the current data voltage may be sequentially provided to a previous pixel and a current pixel included in the pixels according to the panel structure.

In an embodiment, the spatial compensation data may be generated based on a worst pattern according to the panel structure.

In an embodiment, when a difference between the grayscale of the previous data and a grayscale of the current data exceeds a predetermined grayscale threshold, a difference between a previous data voltage corresponding to the previous data and a current data voltage corresponding to the current data may exceed a predetermined voltage threshold.

In an embodiment, when a difference between the previous data voltage and the current data voltage exceeds the predetermined voltage threshold, the scaling factor may exceed a predetermined scaling threshold.

In an embodiment of an electronic device according to the present inventive concept, the electronic device includes a display panel, a data driver and a processor. The display panel includes data lines and pixels connected to the data lines. The data driver is configured to provide a data voltage to the data lines through output buffers. The driving controller is configured to generate a data signal based on input image data to provide the data signal to the data driver. The processor is configured to provide the input image data to the driving controller. The driving controller compensates for the input image data based on a panel structure which is a connection structure of the data lines, the output buffers, and the pixels.

According to the display device, the method of driving the display device, and the electronic device including the display device, input image data may be compensated based on a panel structure, which is a connection structure of data lines, output buffers, and pixels. Accordingly, luminance inconsistencies caused by variations in the panel structure can be corrected, preventing the appearance of stains on the display.

BRIEF DESCRIPTION OF THE DRAWINGS

The above and other features of embodiments of the present inventive concept will become more apparent by describing in detailed embodiments thereof with reference to the accompanying drawings, in which:

FIG. 18 is a diagram showing an example of a scaling lookup table of FIG. 2 according to an embodiment of the present inventive concept;

DETAILED DESCRIPTION

Hereinafter, the present inventive concept will be described in more detail with reference to the accompanying drawings.

The embodiments of the present inventive concept relate to a display device and a method for driving the display device that minimizes visible stains caused by luminance inconsistencies. To address this issue, at least one embodiment introduces a driving controller that dynamically compensates for variations in pixel luminance based on the panel structure of the display panel of the display device. This compensation is achieved by selecting previous and current pixel data, determining spatial compensation data based on the panel structure, and generating a scaling factor that adjusts the pixel's applied voltage. The compensation mechanism may take into account worst-case luminance patterns and use precomputed lookup tables (LUTs) to make real-time corrections. If a pixel transition involves a large grayscale difference, the controller applies a higher or lower voltage adjustment to ensure the current pixel reaches its correct luminance level. This prevents unwanted artifacts caused by charge retention, voltage delays, or insufficient charging time.

By compensating for these luminance inconsistencies, the display device significantly enhances image uniformity and viewing experience. This technology may be beneficial for Organic Light-Emitting Diode (OLED) displays, Quantum Dot Light-Emitting Diode (QLED) displays, Liquid Crystal Display (LCD) devices, and microLED displays, but is not limited thereto. Further, these embodiments may enhance readability, color accuracy, and overall display performance, making it useful for applications in smartphones, tablets, televisions, and monitors.

Figure 1:
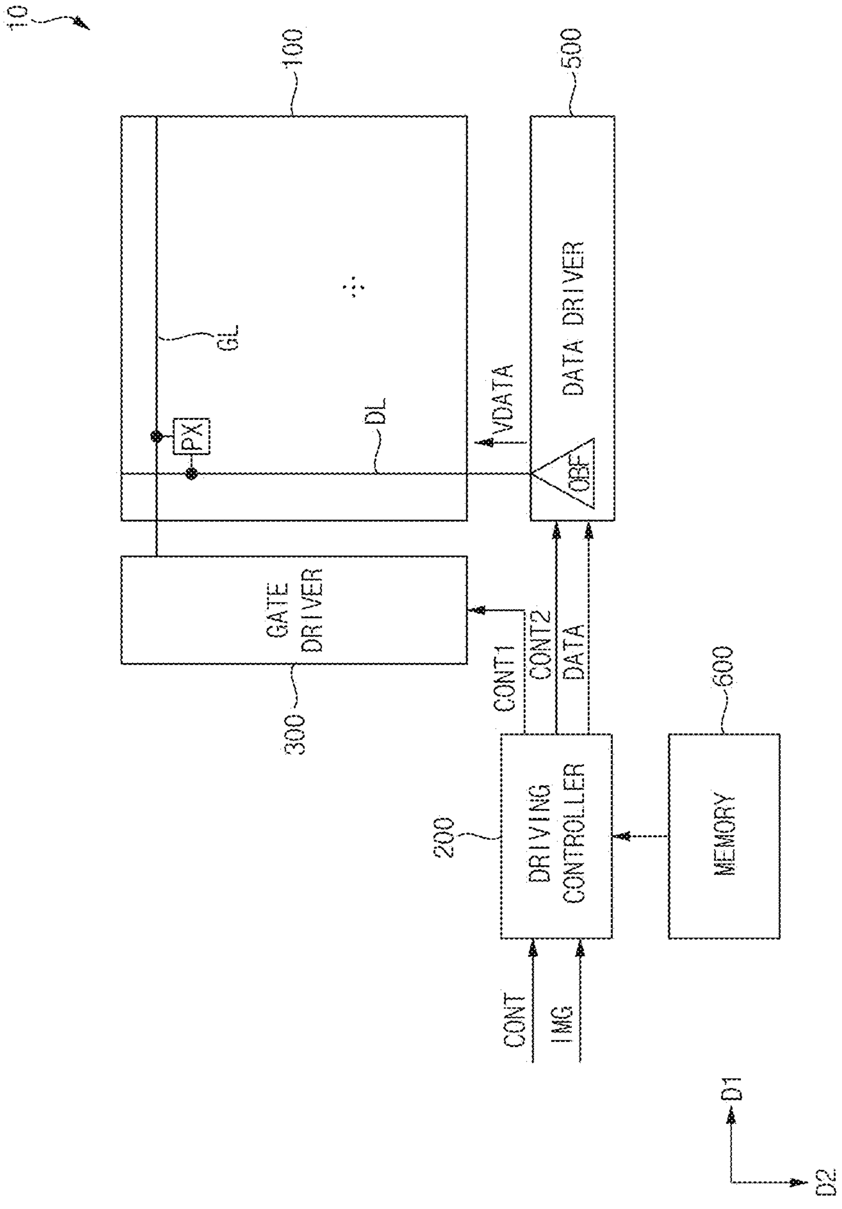
FIG. 1 is a block diagram showing a display device according to an embodiment of the present inventive concept.

FIG. 1 is a block diagram showing a display device 10 according to an embodiment of the present inventive concept.

Referring to FIG. 1, a display device 10 may include a display panel 100 and a display panel driver (e.g., a panel driver circuit). The display panel driver may include a driving controller 200 (e.g., a controller circuit), a gate driver 300 (e.g., a gate driver circuit), and a data driver 500 (e.g., a data driver circuit). The display panel driver may further include a memory 600 (e.g., a memory device).

For example, the driving controller 200 and the data driver 500 may be formed integrally. For example, the driving controller 200, the gate driver 300, and the data driver 500 may be formed integrally. Meanwhile, a drive module in which at least the driving controller 200 and the data driver 500 are formed integrally may be referred to as a Timing Controller Embedded Data Driver (TED).

The display panel 100 may include a display area for displaying an image and a peripheral area disposed adjacent to the display area.

For example, the display panel 100 may be an organic light-emitting diode display panel including an organic light-emitting diode. In another example, the display panel 100 may be a quantum-dot organic light-emitting diode display panel including an organic light-emitting diode and a quantum-dot color filter. In another example, the display panel 100 may be a quantum-dot nano light-emitting diode display panel including a nano light-emitting diode and a quantum-dot color filter. In another example, the display panel 100 may be a liquid crystal display panel including a liquid crystal layer.

The display panel 100 may include gate lines GL, data lines DL, and pixels PX electrically connected to the gate lines GL and the data lines DL, respectively. The gate lines GL may extend in a first direction D1, the data lines DL may extend in a second direction D2 crossing the first direction D1.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, and a data signal DATA based on the input image data IMG, and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral area of the display panel 100.

The data driver 500 may receive the second control signal CONT2 and the data signal DATA from the driving controller 200, and convert the data signal DATA into an analog data voltage VDATA. The data driver 500 may include one or more output buffers OBF connected to at least one of the data lines DL. The data driver 500 may output the data voltage VDATA to the data lines DL through the output buffers OBF.

The memory 600 may store data used to compensate the input image data IMG. For example, the memory 600 may store at least one of panel structure data, a spatial lookup table, and a scaling lookup table. The memory 600 may be a nonvolatile memory such that stored data is not erased even when the display device is turned-off.

Figure 2:
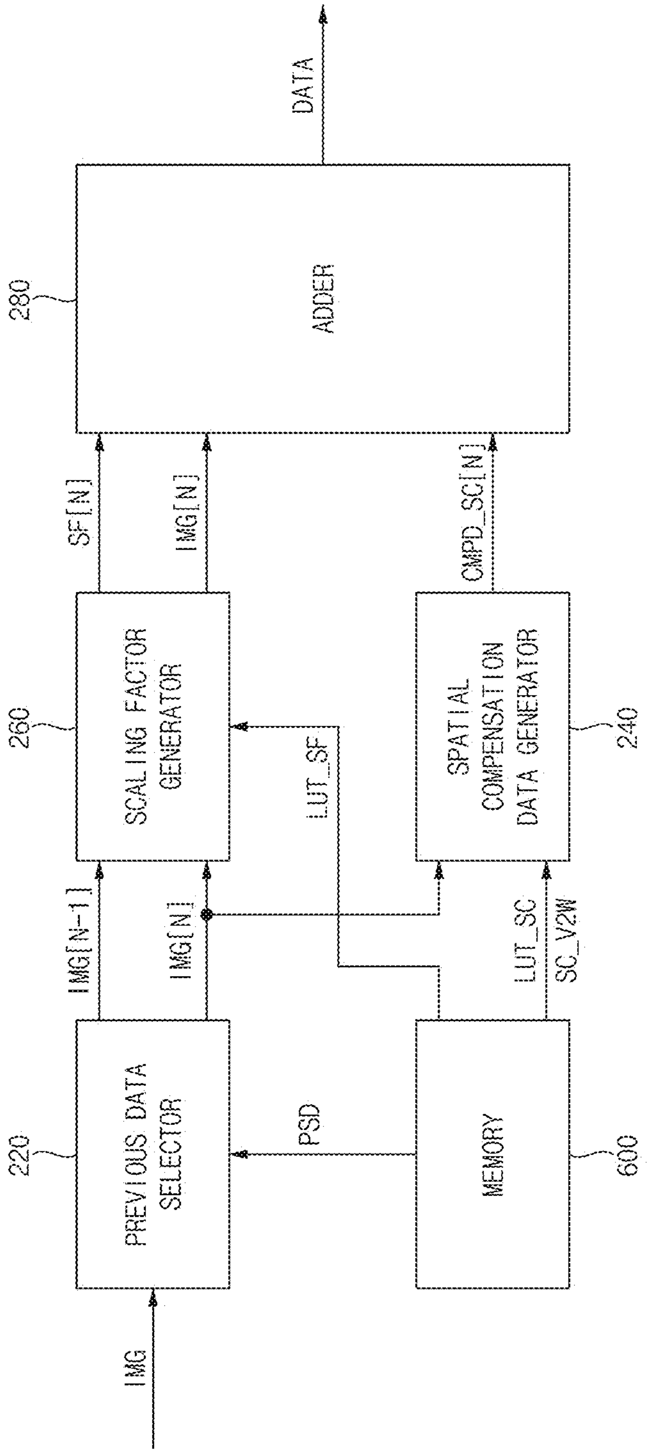
FIG. 2 is a diagram showing a driving controller and a memory of FIG. 1 according to an embodiment of the present inventive concept.

FIG. 2 is a diagram showing a driving controller 200 and a memory 600 of FIG. 1 according to an embodiment.

Referring to FIG. 1 and FIG. 2, a display device 10 may include a driving controller 200 and a memory 600. The driving controller 200 may include a previous data selector 220 (e.g., a selector circuit), a spatial compensation data generator 240 (e.g., a first logic circuit), a scaling factor generator 260 (e.g., a second logic circuit), and an adder 280. In an embodiment, the adder 280 may be replaced with an arithmetic logic unit or a circuit that includes both an adder and a subtractor. The adder 280 may also be configured to perform subtraction when needed. The memory 600 may store panel structure data PSD, a spatial lookup table LUT_SC, and a scaling lookup table LUT_SF. The memory 600 may further store a spatial weight SC_V2W.

The previous data selector 220 may receive input image data IMG and the panel structure data PSD. The panel structure data PSD may include information about the panel structure, which is a connection structure of data lines DL, output buffers OBF, and pixels PX. For example, the panel structure data PSD may define the number, routing, and assignment of data lines DL to output buffers OBF. For example, the panel structure data PSD may specify the positioning and connectivity of the output buffers OBF, detailing which buffers drive specific data lines and how timing delays impact pixel activation. Additionally, the panel structure data PSD may include pixel mapping information, outlining the physical layout, update sequence, and driving method (e.g., ABAB or ABBA) to account for variations in luminance distribution.

The previous data selector 220 may select the previous data IMG[N−1] and the current data IMG[N] from the input image data IMG based on the panel structure data PSD. The current data IMG[N] may be substantially the same as the input image data IMG, and the previous data IMG[N−1] may vary according to the panel structure. The current data IMG[N] may represent the grayscale value of a current pixel being updated. The current pixel is the pixel in the process of receiving its data voltage to display an image. The luminance of the current pixel may be affected by the previous pixel. The previous data IMG[N−1] may represent the grayscale value of the previous pixel that was updated previously that is near or adjacent the current pixel. The previous pixel was updated before the current pixel according to the panel's driving order.

The spatial compensation data generator 240 may generate the spatial compensation data CMPD_SC[N] based on the spatial lookup table LUT_SC and the current data IMG[N]. The spatial lookup table LUT_SC may vary depending on the panel structure, and may include spatial compensation data corresponding to the current data IMG [N]. The spatial compensation data generator 240 may generate interpolated spatial compensation data by interpolating the spatial compensation data included in the above-mentioned spatial lookup table LUT_SC. Accordingly, spatial compensation data for the entire grayscale of the above-mentioned current data IMG[N] may be obtained. The above-mentioned spatial compensation data CMPD_SC[N] may have a positive value, a negative value, or 0.

The spatial compensation data generator 240 may generate the above-mentioned spatial compensation data CMPD_SC[N] in more detail based on the above-mentioned spatial weight SC_V2W. For example, the above-mentioned spatial weight SC_V2W may be a weight for the driving frequency of the display panel 100 or the maximum luminance of an image.

The scaling factor generator 260 may generate a scaling factor SF[N] based on the scaling lookup table LUT_SF, the previous data IMG[N−1], and the current data IMG[N]. The scaling lookup table LUT_SF may include scaling factors corresponding to the previous data IMG[N−1] and the current data IMG[N]. The scaling factor generator 260 may interpolate the scaling factors included in the scaling lookup table LUT_SF to generate an interpolated scaling factor. Accordingly, a scaling factor for the entire grayscale of the previous data IMG[N−1] and the entire grayscale of the current data IMG[N] may be obtained. The scaling factor SF[N] may have a value between 0 and 1. Specifically, when the difference between the grayscale of the previous data IMG[N−1] and the grayscale of the current data IMG[N] is large, the scaling factor SF[N] may be large. When the grayscale of the previous data IMG[N−1] is the same as the grayscale of the current data IMG[N], the scaling factor SF[N] may be 0.

The adder 280 may generate a data signal DATA by compensating the current data IMG[N] based on the scaling factor SF[N] and the spatial compensation data CMPD_SC [N]. Specifically, the adder 280 may scale the spatial compensation data CMPD_SC[N] by the scaling factor SF[N] to generate compensation data, and may compensate the current data IMG[N] by adding the compensation data to the current data IMG[N]. The adder 280 may generate a data signal DATA based on the compensated current data.

In FIG. 2, an overall operation of the driving controller 200 which compensates the input image data IMG based on the panel structure is described. In FIGS. 3 to 18, a specific operation of the previous data selector 220, the spatial compensation data generator 240, and the scaling factor generator 260 are described later.

Figure 3:
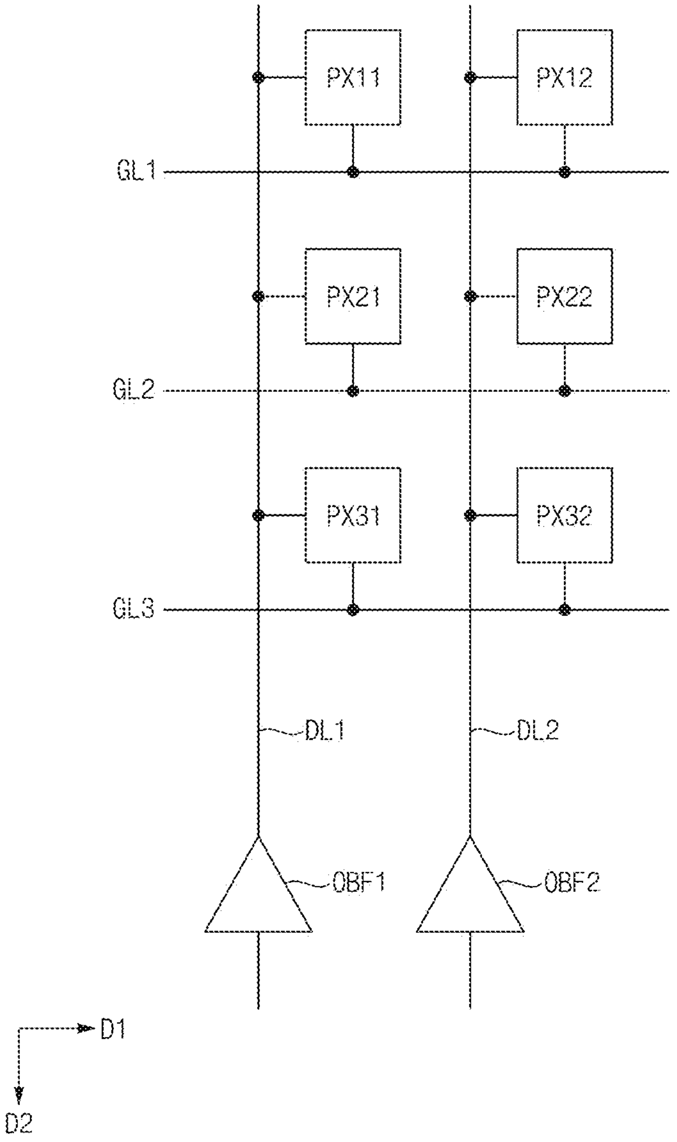
FIG. 3 is a diagram showing an example of a panel structure of a display panel of the display device according to an embodiment of the present inventive concept.
Figure 4:
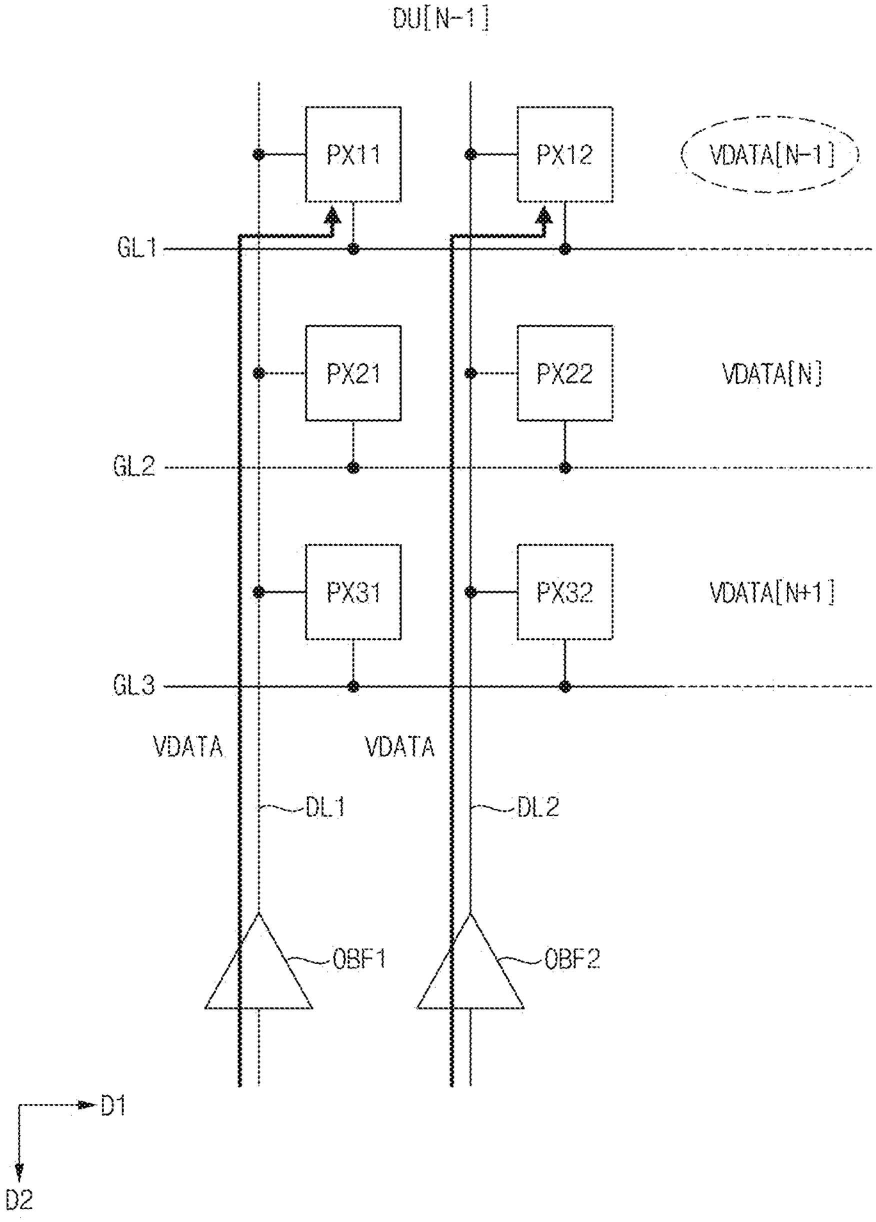
FIGS. 4 to 6 are diagrams explaining an operation of providing a data voltage output from an output buffer included in a panel structure of FIG. 3 to pixels according to an embodiment of the disclosure.
Figure 5:
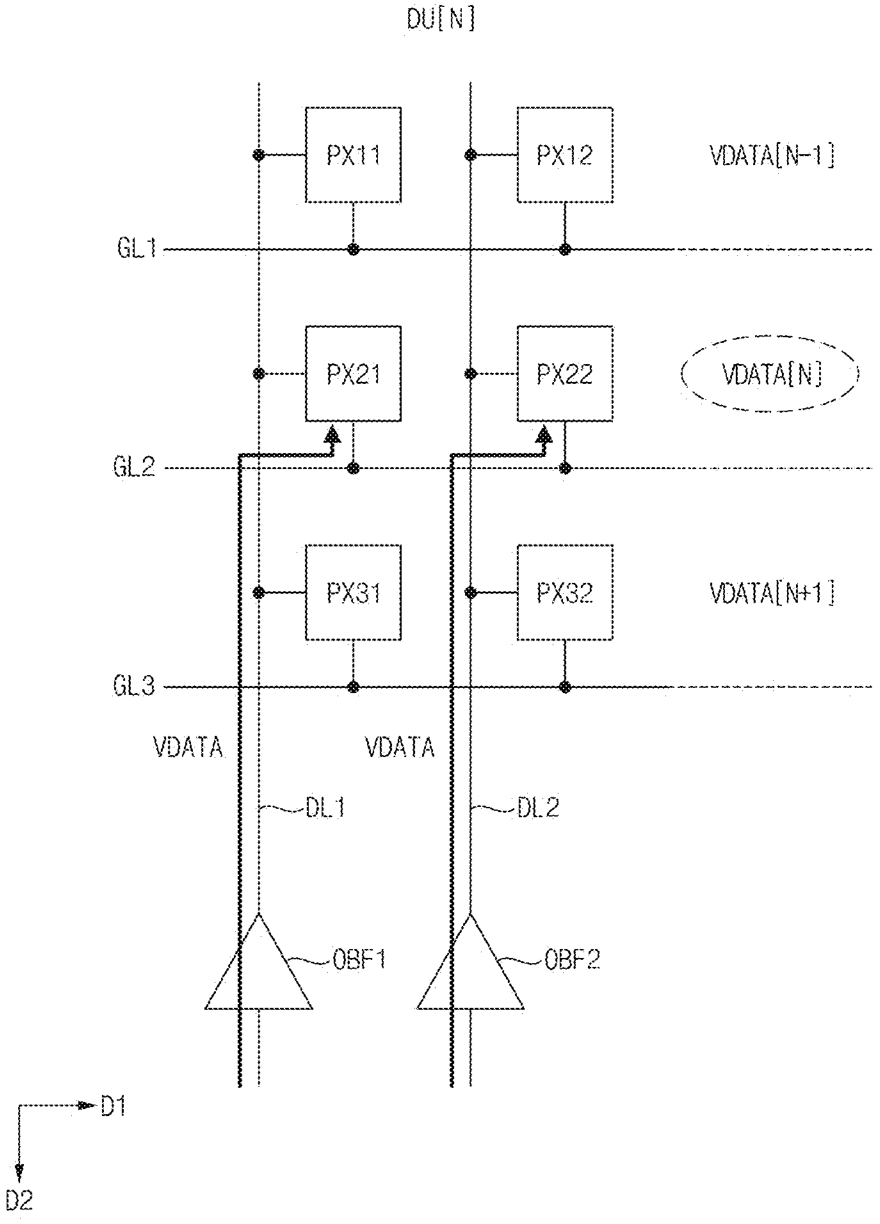
Figure 6:
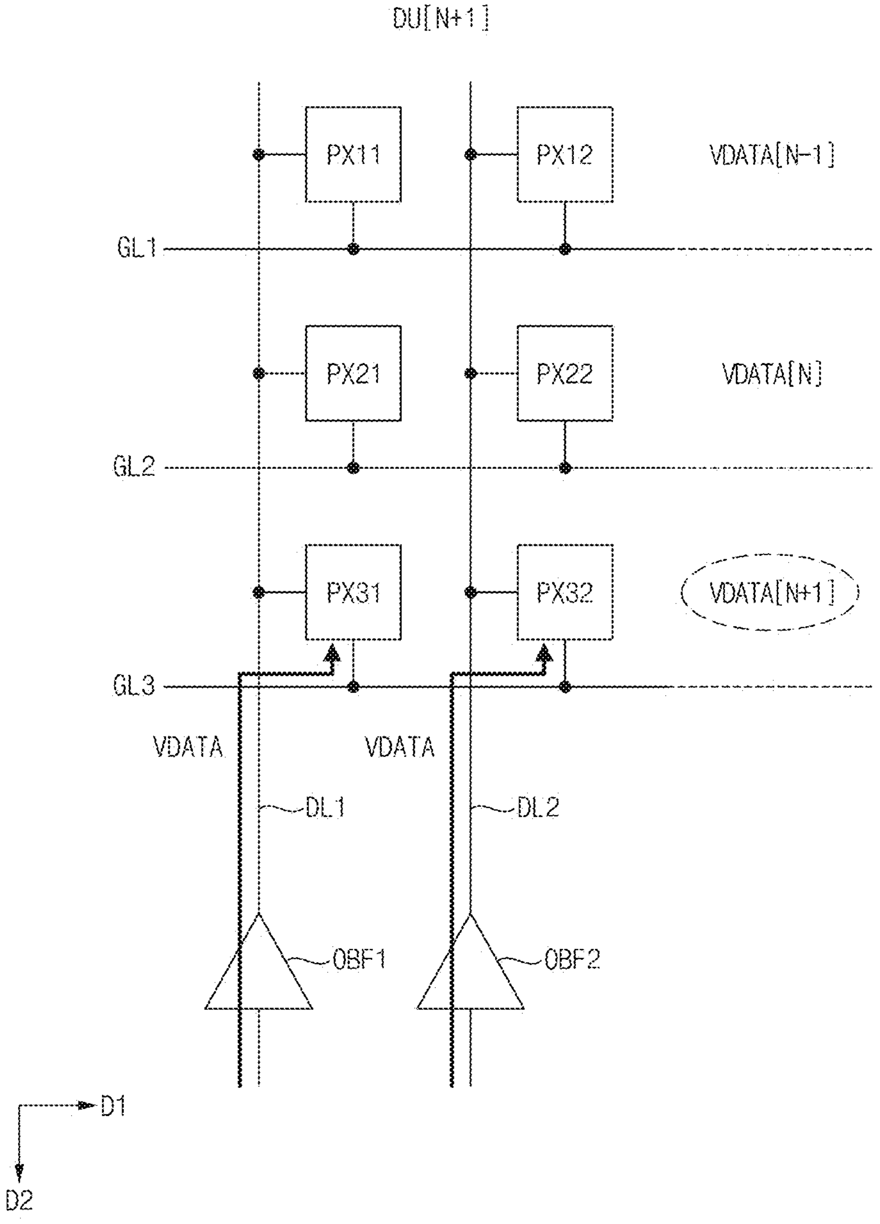

FIG. 3 is a diagram showing an example of a panel structure. FIGS. 4 to 6 are diagrams explaining an operation of providing a data voltage VDATA output from output buffers OBF1, OBF2 included in a panel structure of FIG. 3 to pixels PX11, PX12, PX21, PX22, PX31, PX32.

Referring to FIGS. 3 to 6, a display panel 100 may include gate lines GL1, GL2, GL3, data lines DL1, DL2, and pixels PX11, PX12, PX21, PX22, PX31, PX32 connected to each of the gate lines GL1, GL2, GL3 and the data lines DL1, DL2. Each of the output buffers OBF1, OBF2 may be connected to each of the data lines DL1, DL2. 3×2 pixels PX11, PX12, PX21, PX22, PX31, PX32 shown in FIG. 3 may be part of the pixels PX included in the display panel 100.

A panel structure may be determined based on a connection structure of the data lines DL1, DL2, the output buffers OBF1, OBF2, and the pixels PX11, PX12, PX21, PX22, PX31, PX32. A panel structure of FIG. 3 is characterized in that each of the output buffers OBF1, OBF2 is connected to a corresponding one of the data lines DL1, DL2.

For example, a first output buffer OBF1 may be connected to a first data line DL1 which is connected to first, third, and fifth pixels PX11, PX21, PX31. The first output buffer OBF1 may output a data voltage VDATA to the first data line DL1. In addition, a second output buffer OBF2 may be connected to a second data line DL2 connected to second, fourth, and sixth pixels PX12, PX22, PX32. The second output buffer OBF2 may output the data voltage VDATA to the second data line DL2.

The first pixel PX11 and the second pixel PX12 may be connected to a first gate line GL1 transmitting a first gate signal and may receive the data voltage VDATA in response to the first gate signal. The third pixel PX21 and the fourth pixel PX22 may be connected to a second gate line GL2 transmitting a second gate signal and may receive the data voltage VDATA in response to the second gate signal. The fifth pixel PX31 and the sixth pixel PX32 may be connected to a third gate line GL3 transmitting a third gate signal, and may receive the data voltage VDATA in response to the third gate signal.

As such, the data voltage VDATA output from the first output buffer OBF1 may be sequentially provided to the first, third, and fifth pixels PX11, PX21, PX31. In addition, the data voltage VDATA output from the second output buffer OBF2 may be sequentially provided to the second, fourth, and sixth pixels PX12, PX22, PX32.

Through this, it may be seen that when the data voltage VDATA output from the first output buffer OBF1 changes, the first, third, and fifth pixels PX11, PX21, PX31 are sequentially affected by the data voltage VDATA. In addition, it may be seen that when the data voltage VDATA output from the second output buffer OBF2 changes, the second, fourth, and sixth pixels PX12, PX22, PX32 are sequentially affected by the data voltage VDATA. Through this, the previous data IMG[N−1] and the current data IMG[N] described in FIG. 2 may be specifically explained.

For example, in a previous duration DU[N−1] as shown in FIG. 4, a previous data voltage VDATA[N−1] corresponding to the previous data IMG[N−1] may be output from the first output buffer OBF1 and provided to a previous pixel PX11, in a current duration DU[N] as shown in FIG. 5, a current data voltage VDATA[N] corresponding to the current data IMG[N] may be output from the first output buffer OBF1 and provided to a current pixel PX21, and in a next duration DU[N+1] as shown in FIG. 6, a next data voltage VDATA[N+1] corresponding to next data may be output from the first output buffer OBF1 and provided to a next pixel PX31.

For example, in the previous duration DU[N−1] as shown in FIG. 4, the previous data voltage VDATA[N−1] corresponding to the previous data IMG[N−1] may be output from the second output buffer OBF2 and provided to a previous pixel PX12, in the current duration DU[N] as shown in FIG. 5, the current data voltage VDATA[N] corresponding to the current data IMG[N] may be output from the second output buffer OBF2 and provided to the current pixel PX22, and in the next duration DU[N+1] as shown in FIG. 6, the next data voltage VDATA[N+1] corresponding to the next data may be output from the second output buffer OBF2 and provided to a next pixel PX32.

Figure 7:
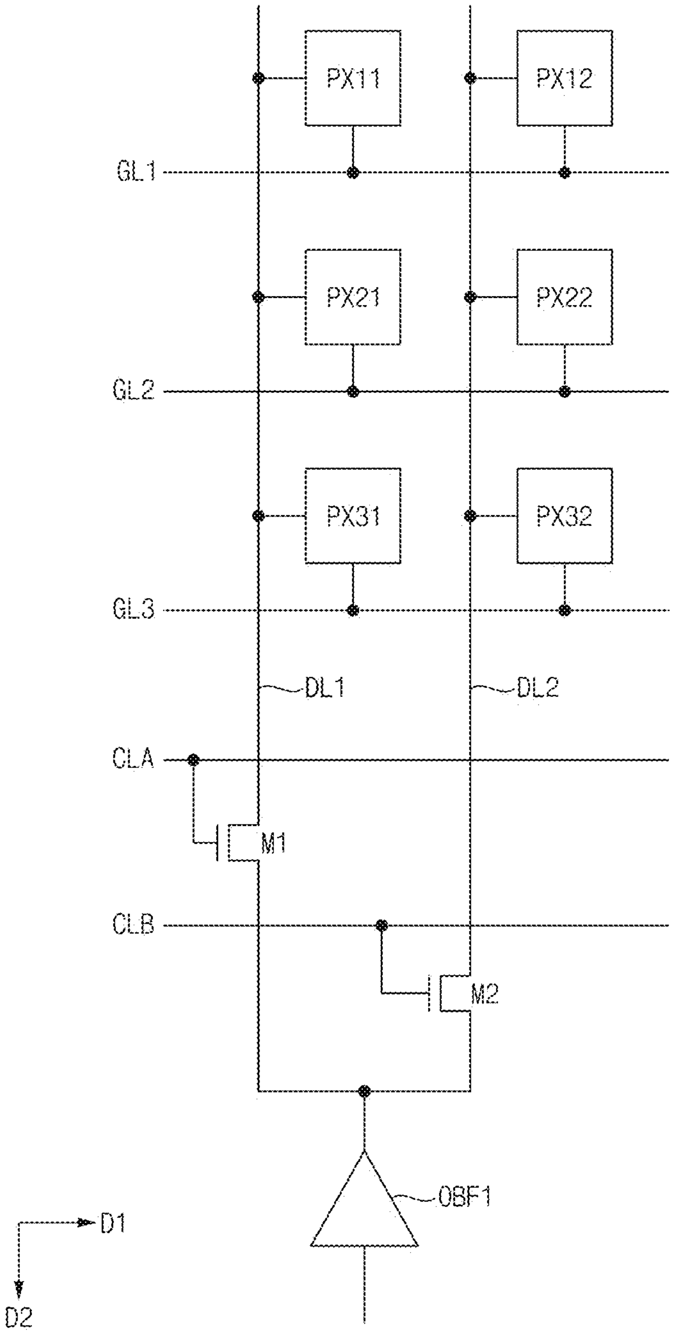
FIG. 7 is a diagram showing an example of the panel structure according to an embodiment of the present inventive concept.

FIG. 7 is a diagram showing an example of a panel structure. FIGS. 8 to 13 are diagrams explaining an operation in which a data voltage VDATA output from an output buffer OBF1 included in the panel structure of FIG. 7 is provided to pixels PX11, PX12, PX21, PX22, PX31, PX32. For example, a single output buffer provides the data voltage VDATA to a pair of data lines.

Referring to FIGS. 7 to 13, a display panel 100 may include gate lines GL1, GL2, GL3, data lines DL1, DL2, and pixels PX11, PX12, PX21, PX22, PX31, PX32 connected to each of the gate lines GL1, GL2, GL3 and the data lines DL1, DL2. A output buffer OBF1 may be connected to the data lines DL1, DL2 through a demux circuit M1, M2. 3×2 pixels PX11, PX12, PX21, PX22, PX31, PX32 shown in FIG. 7 may be a part of the pixels PX included in the display panel 100.

A panel structure may be determined based on a connection structure of the data lines DL1, DL2, the output buffer OBF1, and the pixels PX11, PX12, PX21, PX22, PX31, PX32. A panel structure of FIG. 7 is characterized in that the output buffer OBF1 is connected to the data lines DL1, DL2 through the demux circuit M1, M2. The demux circuit M1, M2 may include a first transistor M1 and a second transistor M2.

For example, a first output buffer OBF1 may be connected to a first data line DL1 which is connected to first, third, and fifth pixels PX11, PX21, PX31 through a first transistor M1. When the first transistor M1 is turned on in response to a first signal CLA, the first output buffer OBF1 may output a data voltage VDATA to the first data line DL1 through the first transistor M1. For example, the first signal CLA may be provided to a gate of the first transistor M1. In addition, the first output buffer OBF1 may be connected to a second data line DL2 connected to second, fourth, and sixth pixels PX12, PX22, PX32 through a second transistor M2. When the second transistor M2 is turned on in response to a second signal CLB, the first output buffer OBF1 may output the data voltage VDATA to the second data line DL2 through the second transistor M2. For example, the second signal CLB may be provided to a gate of the first transistor M1.

The first pixel PX11 and the second pixel PX12 may be connected to a first gate line GL1 transmitting a first gate signal and may receive the data voltage VDATA in response to the first gate signal. The third pixel PX21 and the fourth pixel PX22 may be connected to a second gate line GL2 transmitting a second gate signal and may receive the data voltage VDATA in response to the second gate signal. The fifth pixel PX31 and the sixth pixel PX32 may be connected to a third gate line GL3 transmitting a third gate signal and may receive the data voltage VDATA in response to the third gate signal.

According to a driving method of the demux circuit M1, M2, the data voltage VDATA output from the first output buffer OBF1 may be sequentially provided to the pixels PX11, PX12, PX21, PX22, PX31, PX32. For example, when the driving method of the demux circuit M1, M2 is an ABAB driving method, the data voltage VDATA may be sequentially provided to the first, second, third, fourth, fifth, and sixth pixels PX11, PX12, PX21, PX22, PX31, PX32. For example, when the driving method of the demux circuit M1, M2 is an ABBA driving method, the data voltage VDATA may be sequentially provided to the first, second, fourth, third, fifth, and sixth pixels PX11, PX12, PX21, PX22, PX31, PX32.

Through this, it may be seen that when the data voltage VDATA output from the first output buffer OBF1 changes and the driving method of the demux circuit M1, M2 is the ABAB driving method, the first, second, third, fourth, fifth, and sixth pixels PX11, PX12, PX21, PX22, PX31, PX32 are affected by the data voltage VDATA in that order. In addition, when the data voltage VDATA output from the first output buffer OBF1 changes and the driving method of the demux circuit M1, M2 is the ABBA driving method, it may be seen that the first, second, fourth, third, fifth, and sixth pixels PX11, PX12, PX22, PX21, PX31, PX32 are sequentially affected by the data voltage VDATA. Through this, a previous data IMG[N−1] and a current data IMG[N] described in FIG. 2 will be specifically explained.

According to the driving method of the demux circuit M1, M2, the data voltage VDATA output from the first output buffer OBF1 may be sequentially provided to the pixels PX11, PX12, PX21, PX22, PX31, PX32.

Figure 8:
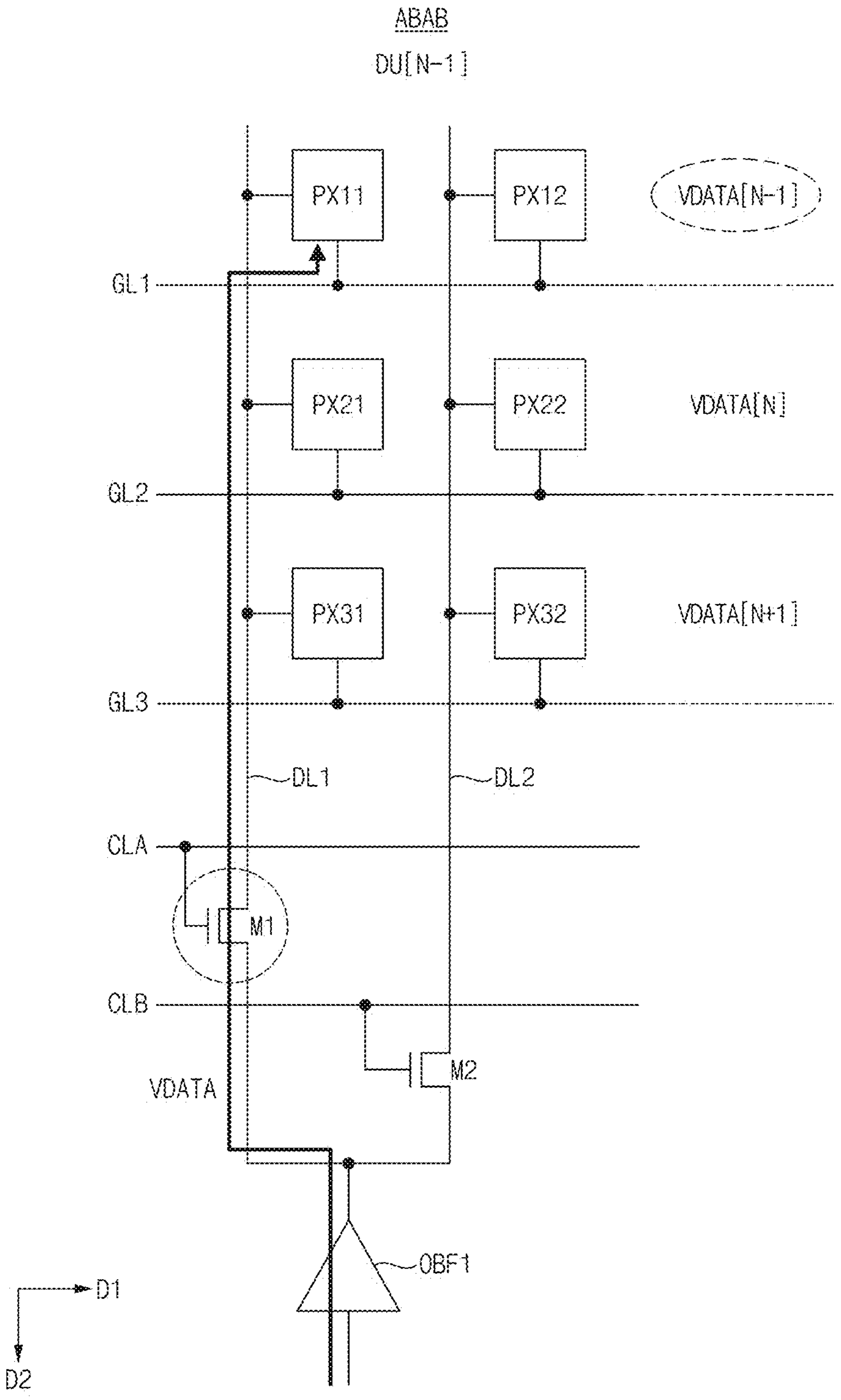
FIGS. 8 to 13 are diagrams explaining an operation in which a data voltage output from an output buffer included in the panel structure of FIG. 7 is provided to pixels according to an embodiment of the present inventive concept.
Figure 9:
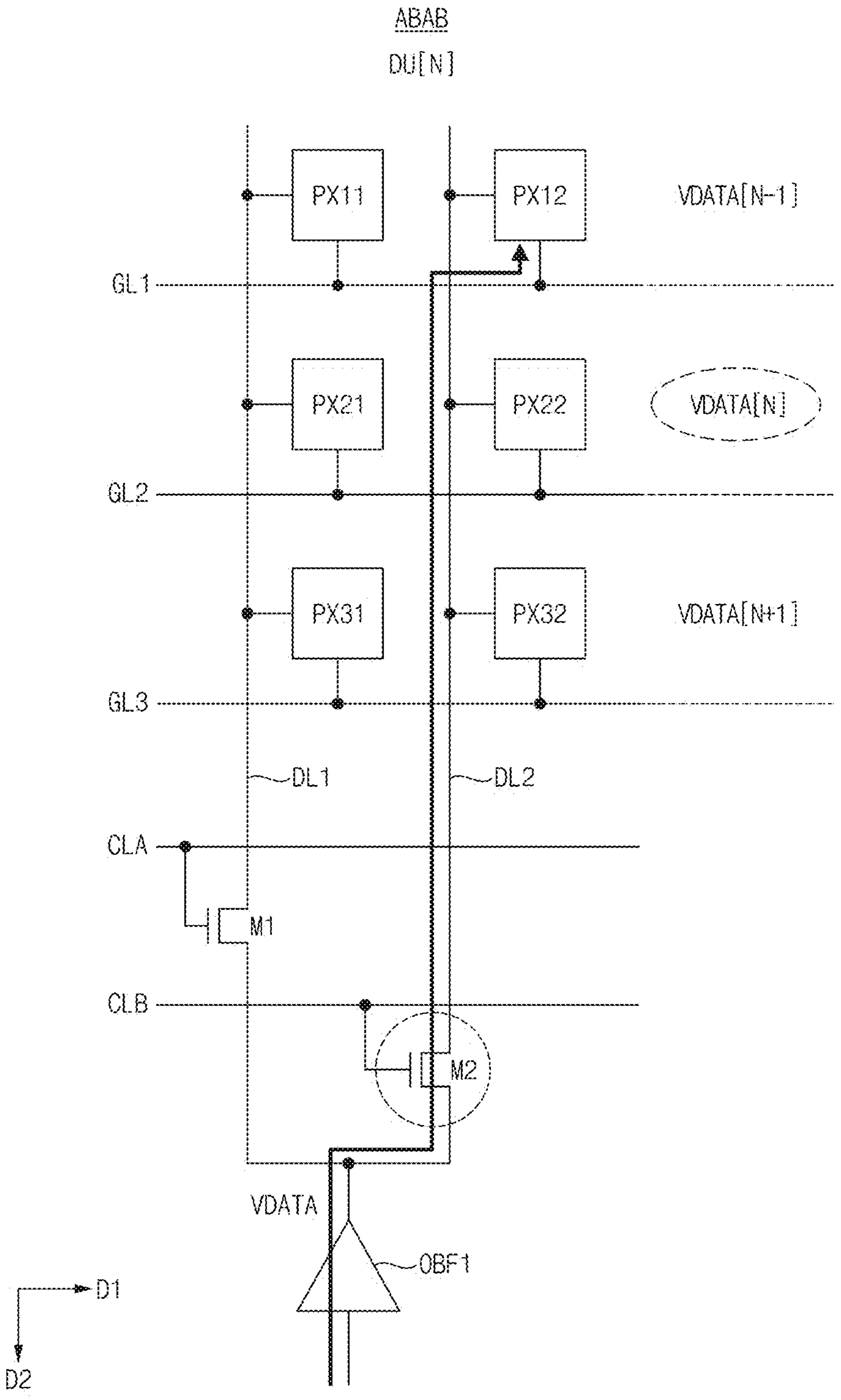
Figure 10:
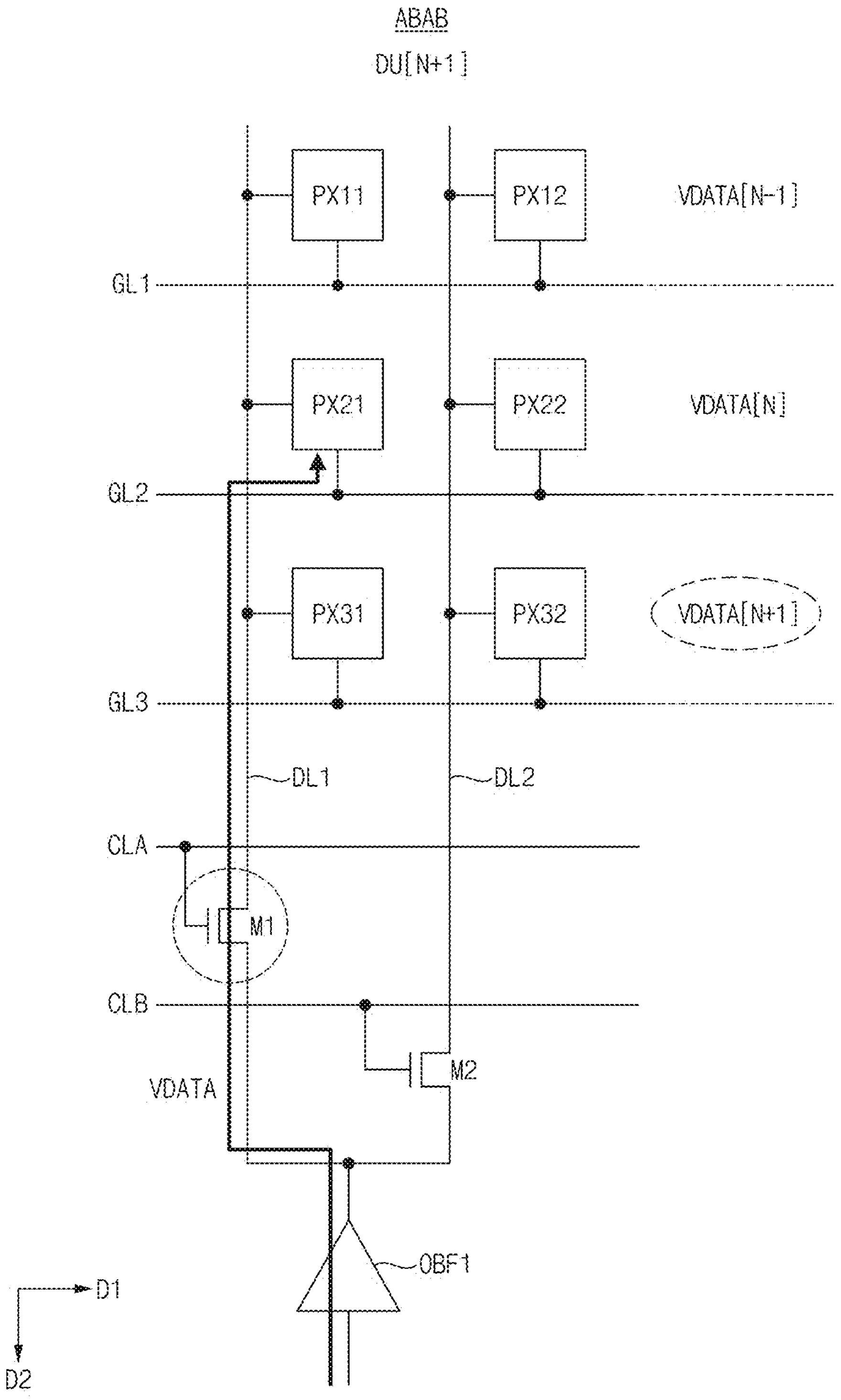

For example, when the driving method of the demux circuit M1, M2 is the ABAB driving method, a previous data voltage VDATA[N−1] corresponding to the previous data IMG[N−1] in a previous duration DU[N−1] may be output from the first output buffer OBF1 and provided to a previous pixel PX11 as shown in FIG. 8, a current data voltage VDATA[N] corresponding to the current data IMG[N] in a current duration DU[N] may be output from the first output buffer OBF1 and provided to a current pixel PX12 as shown in FIG. 9, and a next data voltage VDATA[N+1] corresponding to a next data in a next duration DU[N+1] may be output from the first output buffer OBF1 and provided to a next pixel PX21 as shown in FIG. 10.

Figure 11:
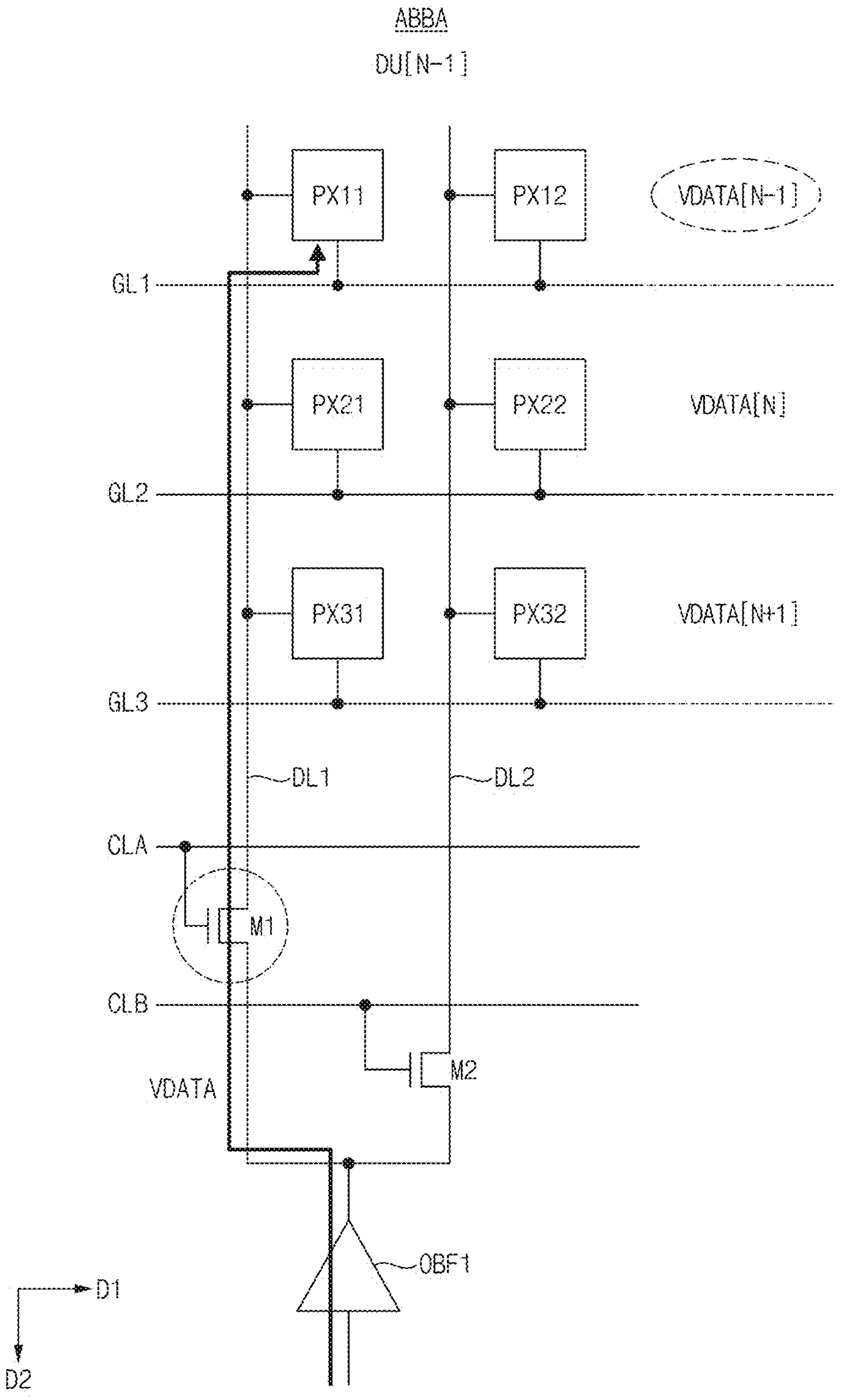
Figure 12:
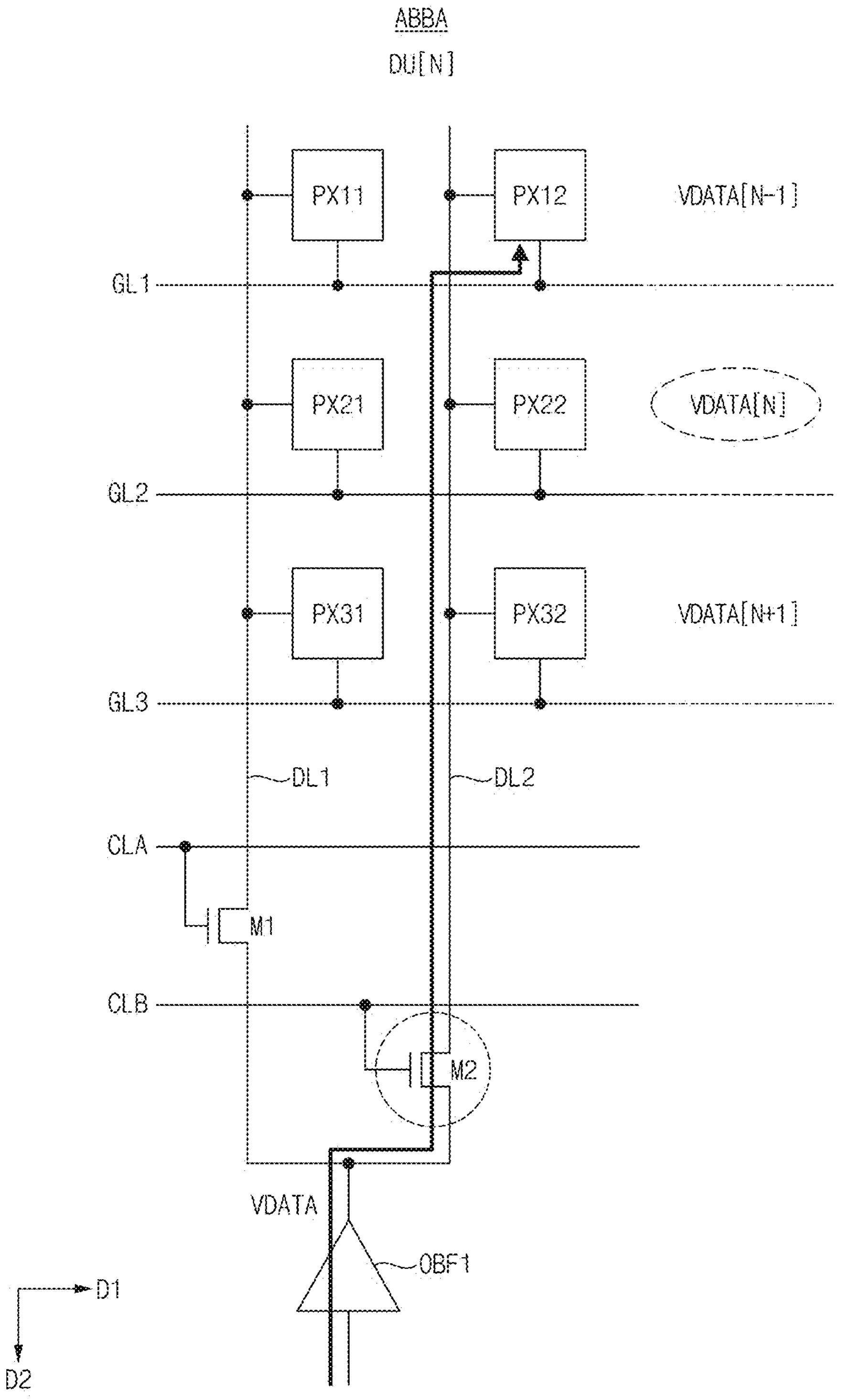
Figure 13:
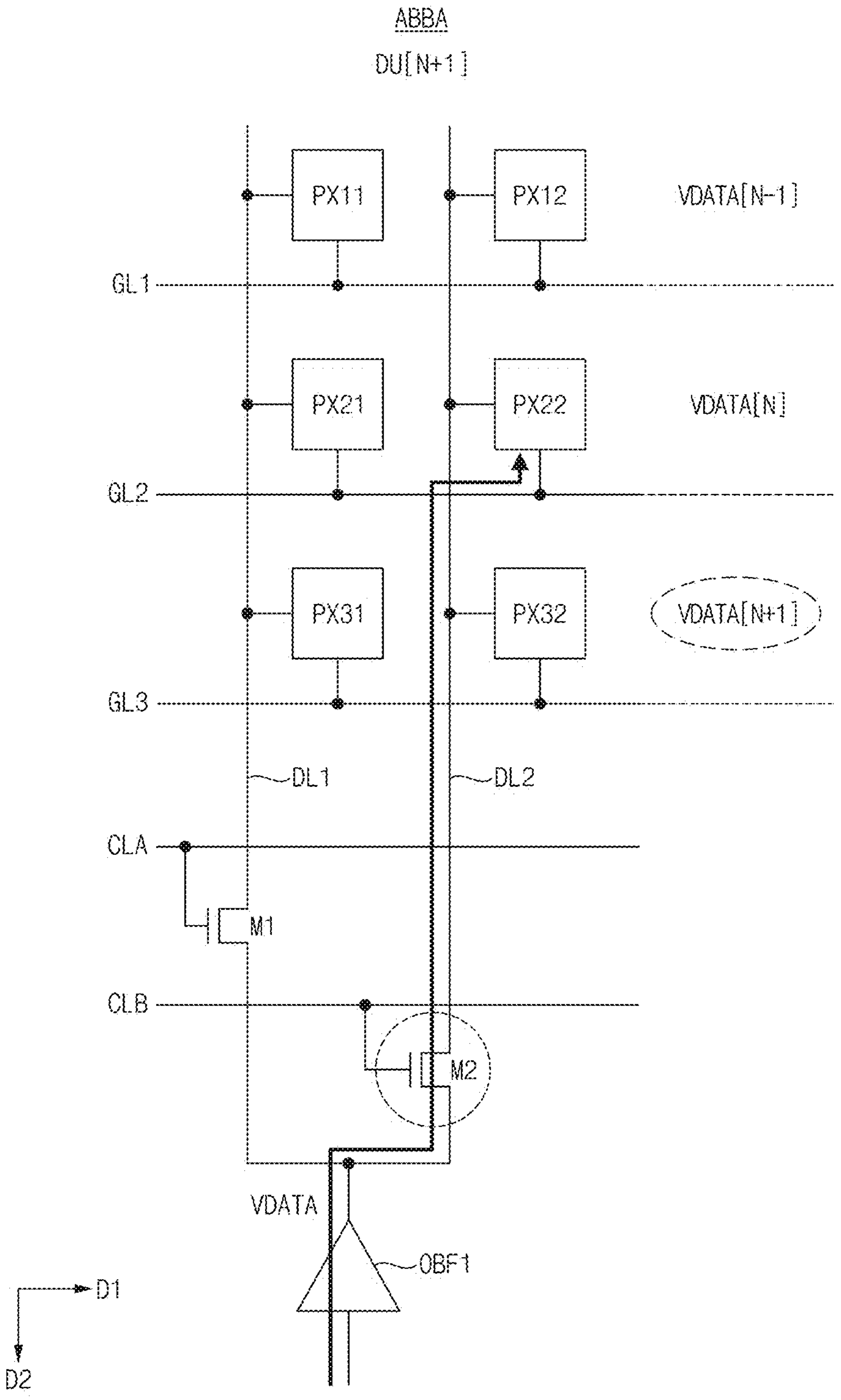

For example, when the driving method of the demux circuit M1, M2 is the ABBA driving method, the previous data voltage VDATA[N−1] corresponding to the previous data IMG[N−1] in the previous duration DU[N−1] may be output from the first output buffer OBF1 and provided to a previous pixel PX11 as shown in FIG. 11, the current data voltage VDATA[N] corresponding to the current data IMG [N] in the current duration DU[N] may be output from the first output buffer OBF1 and provided to a current pixel PX12 as shown in FIG. 12, and the next data voltage VDATA[N+1] corresponding to the next data in the next duration DU[N+1] may be output from the first output buffer OBF1 and provided to a next pixel PX22 as shown in FIG. 13.

FIGS. 3 to 13 are examples of the present inventive concept being applied to various panel structures, and the panel structures of the present inventive concept are not limited thereto. The panel structures of the present inventive concept may vary.

Figure 14:
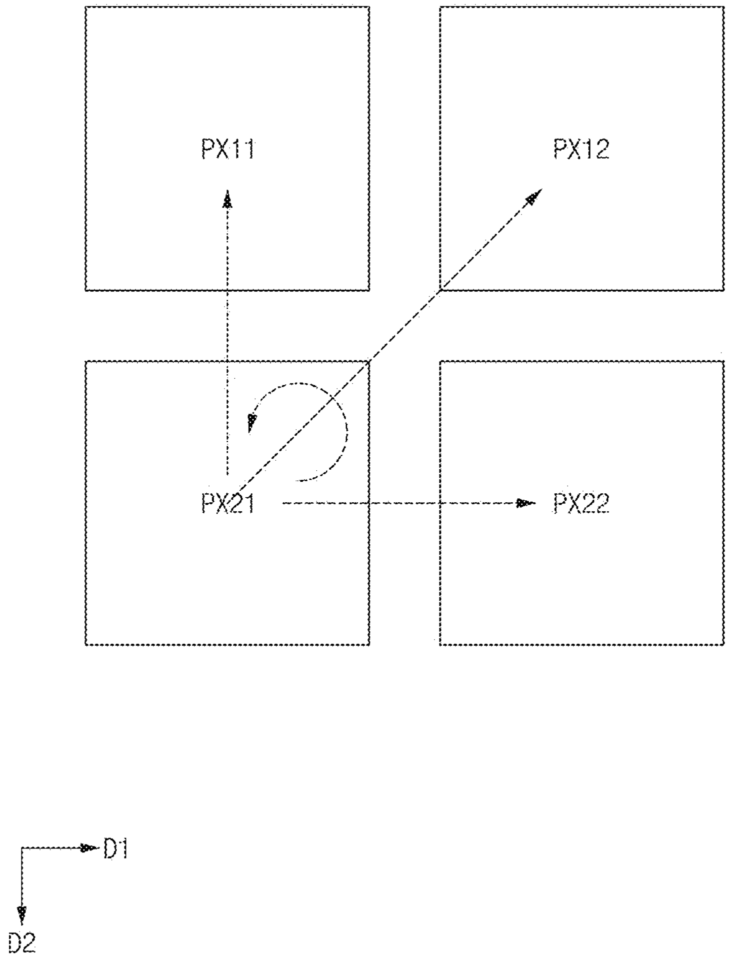
FIG. 14 is a conceptual diagram showing a previous pixel corresponding to a current pixel.

FIG. 14 is a conceptual diagram showing a previous pixel corresponding to a current pixel.

Referring to FIGS. 1 to 14, as described above, a previous pixel corresponding to a current pixel may vary according to a panel structure. For example, when the current pixel is a third pixel PX21, the previous pixel may be a first pixel PX11, a second pixel PX12, a third pixel PX21, or a fourth pixel PX22. Accordingly, a previous data voltage VDATA[N−1] corresponding to a previous data IMG[N−1] may be provided to the previous pixel, and a current data voltage VDATA[N] corresponding to a current data IMG[N] may be provided to the current pixel. In an embodiment, the current pixel is horizontally, vertically, or diagonally adjacent the previous pixel or vice versa.

Figure 15:
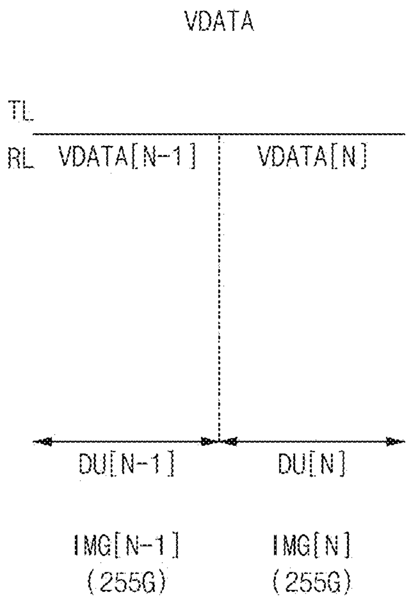
FIG. 15 is a diagram showing a previous data voltage and a current data voltage output from an output buffer based on full pattern data according to an embodiment of the present inventive concept.

FIG. 15 is a diagram showing a previous data voltage VDATA[N−1] and a current data voltage VDATA[N] output from an output buffer based on full pattern data.

Referring to FIG. 15, the full pattern data may mean input image data IMG having a same grayscale for all pixels PX. For example, the input image data IMG may have a same grayscale of 255 for all the pixels PX. In this case, in a previous duration DU[N−1] and a current duration DU[N], a previous data IMG[N−1] and a current data IMG[N] may be provided, and the previous data IMG[N−1] and the current data IMG[N] may both have a grayscale of 255.

A previous data voltage VDATA[N−1] and a current data voltage VDATA[N] corresponding to the previous data IMG[N−1] and the current data IMG[N] may be provided to a previous pixel and a current pixel, respectively. Since the current data voltage VDATA[N] is equal to the previous data voltage VDATA[N−1], an actual level RL may reach a target level TL without a delay. Therefore, a charging rate of each of the previous pixel and the current pixel may be sufficient, and the previous pixel and the current pixel may emit light with a target luminance corresponding to the target level TL, and a stain should not be perceived by a user.

Figure 16:
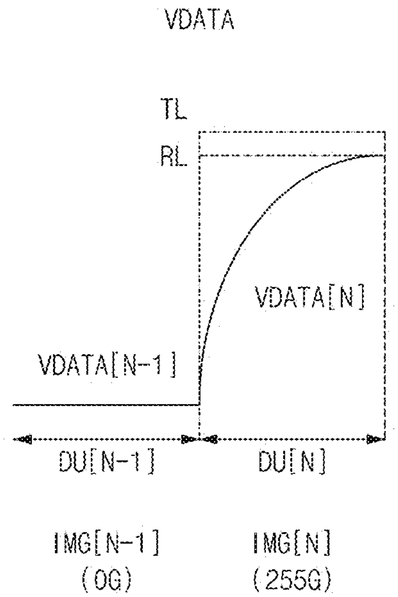
FIG. 16 is a diagram showing a previous data voltage and a current data voltage output from an output buffer based on a dynamic pattern data according to an embodiment of the present inventive concept.

FIG. 16 is a diagram showing a previous data voltage VDATA[N−1] and a current data voltage VDATA[N] output from an output buffer based on a dynamic pattern data.

Referring to FIG. 16, the dynamic pattern data may mean input image data IMG having different grayscales for pixels PX. For example, in the previous duration DU[N−1] and the current duration DU[N], the previous data IMG[N−1] and the current data IMG[N] may be provided, and the previous data IMG[N−1] may have a grayscale of 0, and the current data IMG[N] may have a grayscale of 255.

A previous data voltage VDATA[N−1] and a current data voltage VDATA[N] corresponding to the previous data IMG[N−1] and the current data IMG[N] may be provided to the previous pixel and the current pixel, respectively.

Unlike the full pattern data, in the dynamic pattern data, a data voltage VDATA[N−1], VDATA[N] output from an output buffer OBF may change over a time, such that a delay may occur until an actual level RL reaches a target level TL.

The greater a difference between a grayscale of the previous data IMG[N−1] and a grayscale of the current data IMG[N], the greater a delay may be. According to a length of the delay, the current data voltage VDATA[N] may not reach the target level TL. That is, the actual level RL may be different from the target level TL. For example, when the grayscale of the input image data IMG changes from a grayscale of 0 to a grayscale of 255, the delay may be large, and the current data voltage VDATA[N] may not reach the target level TL. Therefore, a charging rate of each of the previous pixel and the current pixel may be insufficient, and the previous pixel and the current pixel may not emit a light with a target luminance corresponding to the target level TL, and a stain may be perceived by the user.

As such, when the pixels PX emit light based on the input image data IMG, which is the dynamic pattern data, unlike the full pattern data, the stain may be recognized by the user.

Figure 17:
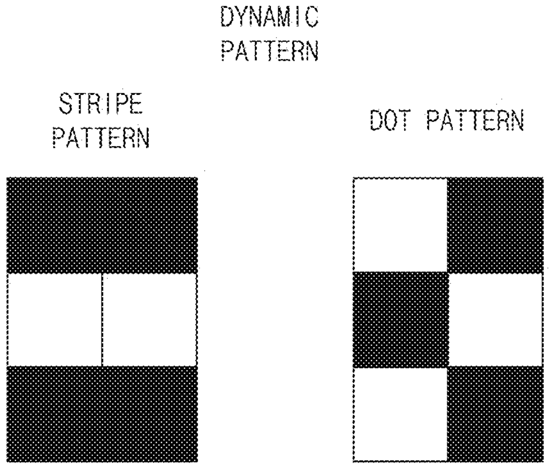
FIG. 17 is a diagram showing the worst pattern according to the panel structure.

FIG. 17 is a diagram showing the worst pattern according to the panel structure.

Referring to FIGS. 1 to 17, as described above, a previous pixel corresponding to a current pixel may be different according to a panel structure. Therefore, a worst pattern (or worst case pattern) in which a stain is perceived may be different according to the panel structure. Here, the worst pattern may be a dynamic pattern of a dynamic pattern data. A worst pattern for a panel structure of FIG. 3 and a worst pattern for an ABAB driving method of a panel structure of FIG. 7 may be a stripe pattern of FIG. 17. The stripe pattern may consist of alternating rows or columns of different grayscale values (e.g., high-low-high-low). A worst pattern for an ABBA driving method of a panel structure of FIG. 7 may be a dot pattern of FIG. 17. The dot pattern may consist of isolated bright or dark pixels scattered across the display, rather than continuous rows or columns of brightness transitions.

Since the worst pattern causing a stain is different according to the panel structure, a display device 10 according to an embodiment of the present inventive concept compensates input image data IMG according to the panel structure.

Referring to FIG. 2 again, a previous data selector 220 may receive input image data IMG and the panel structure data PSD. The previous data selector 220 may select a previous data IMG[N−1] and a current data IMG[N] from the input image data IMG based on the panel structure included in the panel structure data PSD. Therefore, the previous data IMG[N−1] may be selected based on the panel structure.

A spatial compensation data generator 240 may generate spatial compensation data CMPD_SC[N] based on a spatial lookup table LUT_SC and a current data IMG[N]. A spatial compensation data included in the spatial lookup table LUT_SC may be generated based on a worst pattern according to the panel structure, where the current data IMG[N] corresponds to the input image data IMG. Therefore, the spatial compensation data applied to the current data IMG[N] compensates for a stain caused based on the panel structure. Spatial compensation data included in the spatial lookup table LUT_SC may be obtained using an imaging device for the worst pattern during a process. For example, the imaging device may image a display panel 100 cell by cell. Therefore, the spatial compensation data IMG[N] may have data for pixels PX included in the display panel 100.

FIG. 18 is a diagram showing an example of a scaling lookup table LUT_SF of FIG. 2 according to an embodiment.

Referring to FIGS. 1 to 18, a scaling factor generator 260 may generate a scaling factor SF[N] based on a scaling lookup table LUT_SF, previous data IMG[N−1], and current data IMG[N]. The scaling factor SF[N] may have a value between 0 and 1. As described above, when a difference between a grayscale of the previous data IMG[N−1] and a grayscale of the current data IMG[N] is large, a difference between an actual level RL and a target level TL may be large. Therefore, the scaling factor SF[N] may be large. However, when the grayscale of the previous data IMG[N−1] is equal to the grayscale of the current data IMG[N], the actual level RL may be equal to the target level TL. Therefore, the scaling factor SF[N] may be 0. That is, the current data IMG[N] may not be compensated.

For example, when the grayscale of the previous data IMG[N−1] is 0 and the grayscale of the current data IMG[N] is 0, the scaling factor SF[N] may be 0. For example, when the grayscale of the previous data IMG[N−1] is 0 and the grayscale of the current data IMG[N] is 16, the scaling factor SF[N] may be 1. For example, when the grayscale of the previous data IMG[N−1] is 8 and the grayscale of the current data IMG[N] is 16, the scaling factor SF[N] may be 0.87. In FIG. 18, a case where the grayscale of the previous data IMG[N−1] is equal to or less than the current data IMG[N] is shown. The scaling factor SF[N] may also be applied when the grayscale of the previous data IMG[N−1] is equal to or greater than the current data IMG[N].

As such, according to the display device 10 according to embodiments of the present inventive concept, input image data IMG may be compensated based on a panel structure, which is a connection structure of data lines DL, output buffers OBF, and pixels PX. Accordingly, a stain occurring due to a difference of the panel structure may be prevented.

An embodiment of the disclosure provides a compensation mechanism that dynamically adjusts based on the grayscale difference between the previous data IMG[N−1]) of a previous pixel and the current data IMG[N] of a current pixel to ensure uniform luminance across the display. When the grayscale difference is small, meaning the transition between the previous and current pixel is minimal, the compensation applied is low or zero, as the pixel can naturally reach its target brightness. However, when the grayscale difference is large, such as transitioning from a dark pixel to a bright pixel or vice versa, the compensation mechanism adjusts the applied voltage accordingly. For a dark-to-bright transition, the driving voltage may be boosted (or increased) to help the current pixel charge faster and reach the intended luminance within the given frame time. Conversely, for a bright-to-dark transition, the compensation may involve reducing the voltage or actively discharging residual charge to prevent unwanted afterglow or ghosting effects. These adjustments may be determined using scaling factors and precomputed lookup tables LUTs, allowing real-time corrections based on panel structure and worst-case luminance transitions.

When compensating for luminance inconsistencies, the scaling factor SF[N] may adjust the spatial compensation data CMPD_SC[N] to ensure smooth grayscale transitions between pixels. For example, if the previous pixel has a grayscale value of 8 and the current pixel has a grayscale value of 16, a scaling factor of 0.87 may be applied to moderate the correction. Assuming that the spatial compensation data CMPD_SC[N] for this transition is precomputed as 5, the scaling factor may be used to refine this value. The adjusted compensation may be calculated as SF[N]× CMPD_SC[N], which results in 4.35. This means that instead of applying the full correction of 5, the system scales it down based on the grayscale difference and panel structure.

Once the compensation is determined, the system modifies the current pixel's grayscale value by adding the adjusted compensation factor. The compensated grayscale value is computed as the sum of grayscale of the current pixel (i.e., 16) and the adjusted compensation (e.g., 4.35), resulting in 20.35. For example, the adder 280 may calculate this sum. Since grayscale values are typically stored as integers, this value may be rounded to 20 before being applied to the display. By dynamically adjusting the compensation using the scaling factor, the display ensures that the current pixel achieves its intended luminance while preventing overcorrection or visible artifacts. This approach helps maintain uniform brightness and eliminates stain effects that arise from charge retention and signal propagation delays in the panel structure.

According to an embodiment, a display device is provided that includes a display panel (e.g., a 100) including data lines and pixels connected to the data lines, a data driver (e.g., 16-) configured to provide a data signal to the data lines, and a driving controller (e.g., 200). The driving controller of this embodiment is configured to: i) determine a scaling factor (e.g., SF[n]) based on a grayscale difference between a previous pixel and a current pixel, wherein the previous pixel and the current pixel are adjacent to each other among the pixels, and the previous pixel is driven before the current pixel, ii) generate a compensation value by applying the scaling factor to spatial compensation data associated with a position of the current pixel, iii) apply the compensation value to input image data to generate a data signal and iv) provide the data signal to the data driver. For example, the adder 280 may add the compensation value to the input image data or subtract the compensation value from the input image data. For example, if the current pixel is expected to be too dim due to prior charge retention or parasitic effects, the compensation value may be added to increase its brightness; and if the current pixel is expected to be too bright due to residual charge from the previous pixel, the compensation value may be subtracted to reduce its brightness.

Figure 19:
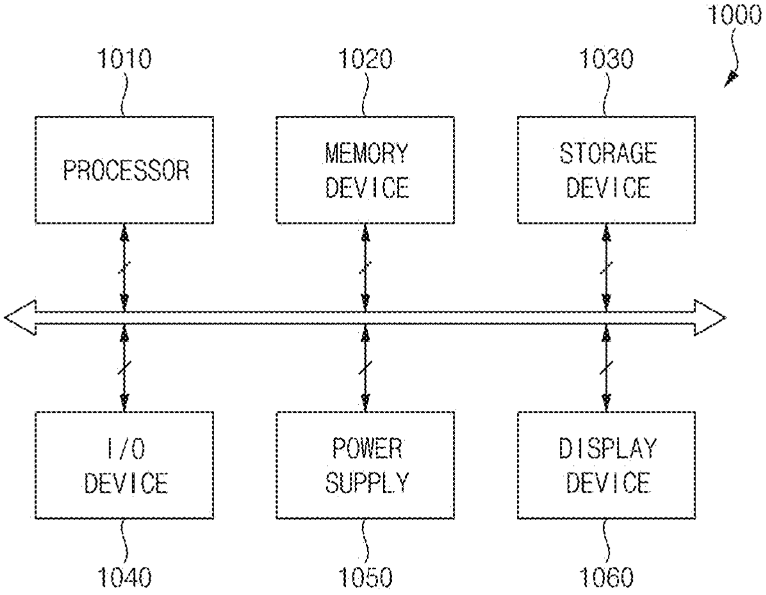
FIG. 19 is a block diagram showing an electronic device according to an embodiment of the present inventive concept.
Figure 20:
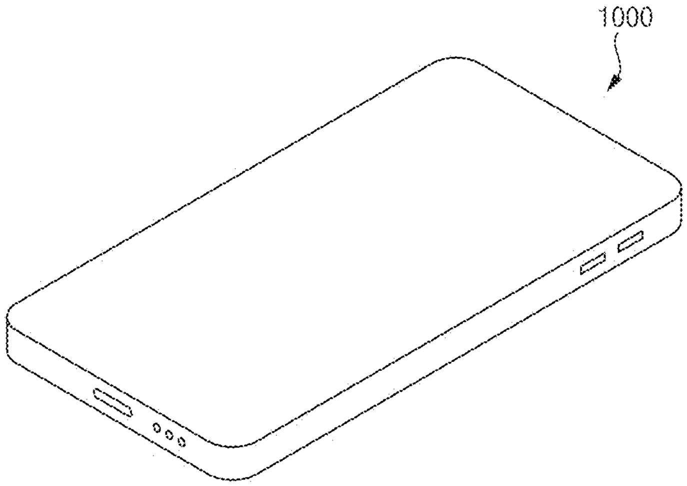
FIG. 20 is a diagram showing an embodiment in which an electronic device of FIG. 19 is implemented as a smart phone.

FIG. 19 is a block diagram showing an electronic device 1000 according to an embodiment. FIG. 20 is a diagram showing an embodiment in which an electronic device 1000 of FIG. 19 is implemented as a smart phone.

Referring to FIGS. 19 and 20, the electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

In an embodiment, as shown in FIG. 20, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a micro processor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

Figure 21:
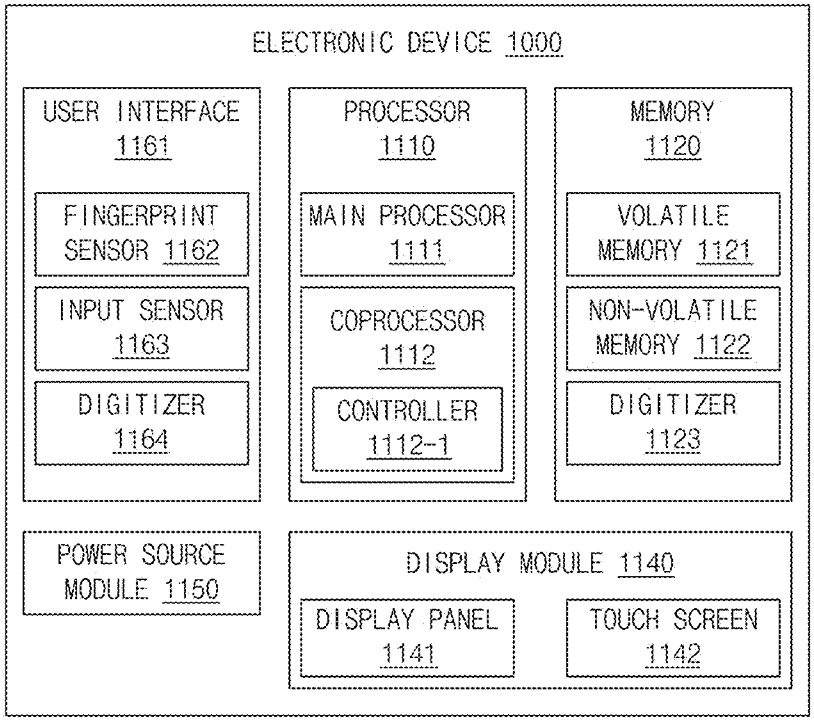
FIG. 21 is a block diagram showing an electronic device according to an embodiment of the present inventive concept.

FIG. 21 is a diagram illustrating an electronic device according to an embodiment of the present invention. Referring to FIG. 21, the electronic device 1000 according to one embodiment of the present invention may output various information (e.g., images, text, music, etc.) through a display module 1140, which, for example, may correspond to the display device shown in FIG. 1. When a processor 1110 executes an application stored in a memory 1120, the display module 1140 may provide application information to a user through a display panel 1141. The processor 1110 may be used to implement processor 1010. The memory 1120 may be used to implement the memory device 1020.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include a software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display module 1140 may be used to implement the display device 1060. The display panel 1141 may include the display unit shown in FIG. 1.

The power source module 1150 may supply power to the components of the electronic device 1000. The power source module 1150 may be used to implement the power supply 1050. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A display device, comprising:

a display panel including data lines and pixels connected to the data lines;

a data driver configured to provide a data voltage to the data lines through output buffers; and a driving controller configured to generate a data signal based on input image data to provide the data signal to the data driver, wherein the driving controller is configured to:

determine, based on a panel structure including a connection structure of the data lines, the output buffers, and the pixels, a driving order of the pixels;

select, from the input image data, current data corresponding to a current one of the pixels and previous data corresponding to at least one of the pixels earlier in the driving order; and compensate the current data based on at least the previous data.

2. The display device of claim 1, wherein the driving controller generates spatial compensation data based on the panel structure and the current data, generates a scaling factor based on the previous data and the current data, and compensates for the current data based on the spatial compensation data and the scaling factor.

3. The display device of claim 2, wherein the output buffer sequentially outputs a previous data voltage corresponding to the previous data and a current data voltage corresponding to the current data, and wherein the previous data voltage and the current data voltage are sequentially provided to a previous pixel and a current pixel included in the pixels according to the panel structure.

4. The display device of claim 2, wherein the spatial compensation data is generated based on a worst pattern according to the panel structure.

5. The display device of claim 2, wherein, when a difference between the grayscale of the previous data and a grayscale of the current data exceeds a predetermined grayscale threshold, a difference between a previous data voltage corresponding to the previous data and a current data voltage corresponding to the current data exceeds a predetermined voltage threshold.

6. The display device of claim 5, wherein, when a difference between the previous data voltage and the current data voltage exceeds the predetermined voltage threshold, the scaling factor exceeds a predetermined scaling threshold.

7. The display device of claim 5, wherein, when the grayscale of the previous data is equal to the grayscale of the current data, the scaling factor is 0.

8. The display device of claim 2, wherein the driving controller scales the spatial compensation data by the scaling factor to generate compensation data, and adds the compensation data to the current data to compensate the current data.

9. The display device of claim 2, wherein the display device further comprises a memory configured to store panel structure data, a spatial lookup table, and a scaling lookup table, and wherein the panel structure data includes information about the panel structure, the spatial lookup table includes spatial compensation data corresponding to the current data, and the scaling lookup table includes the scaling factor corresponding to the previous data and the current data.

10. The display device of claim 9, wherein the driving controller interpolates the spatial compensation data included in the spatial lookup table to generate interpolated spatial compensation data.

11. The display device of claim 9, wherein the driving controller interpolates the scaling factor included in the scaling lookup table to generate interpolation spatial compensation data.

12. The display device of claim 9, wherein the memory further includes a spatial weight.

13. The display device of claim 2, wherein the driving controller comprises:

a previous data selector configured to select the previous data and the current data from the input image data based on the panel structure;

a spatial compensation data generator configured to generate the spatial compensation data based on the panel structure and the current data;

a scaling factor generator configured to generate the scaling factor based on the previous data and the current data; and an adder configured to compensate for the current data based on the scaling factor and the spatial compensation data.

14. A method of driving a display device, the method comprising:

determining, based on a panel structure including a connection structure of data lines, output buffers, and pixels, a driving order of pixels of the display device;

selecting, from input image data, current data corresponding to a current one of the pixels and previous data corresponding to at least one of the pixels earlier in the driving order;

compensating the current data based on at least the previous data to generate a data signal;

converting the data signal into a data voltage; and providing the data voltage to the data lines through the output buffers.

15. The method of claim 14, wherein the compensating comprises:

generating spatial compensation data based on the panel structure and the current data;

generating a scaling factor based on the previous data and the current data; and compensating for the current data based on the spatial compensation data and the scaling factor to generate the data signal.

16. The method of claim 15, wherein the output buffer sequentially outputs a previous data voltage corresponding to the previous data and a current data voltage corresponding to the current data, and wherein the previous data voltage and the current data voltage are sequentially provided to a previous pixel and a current pixel included in the pixels according to the panel structure.

17. The method of claim 15, wherein the spatial compensation data is generated based on a worst pattern according to the panel structure.

18. The method of claim 15, wherein, when a difference between the grayscale of the previous data and a grayscale of the current data exceeds a predetermined grayscale threshold, a difference between a previous data voltage corresponding to the previous data and a current data voltage corresponding to the current data exceeds a predetermined voltage threshold.

19. The method of claim 18, wherein, when a difference between the previous data voltage and the current data voltage exceeds the predetermined voltage threshold, the scaling factor exceeds a predetermined scaling threshold.

20. An electronic device, comprising:

a display panel including data lines and pixels connected to the data lines;

a data driver configured to provide a data voltage to the data lines through output buffers;

a driving controller configured to generate a data signal based on input image data to provide the data signal to the data driver; and a processor configured to provide the input image data to the driving controller, wherein the driving controller is configured to;

determine, based on a panel structure including a connection structure of the data lines, the output buffers, and the pixels, a driving order of the pixels;

select, from the input image data, current data corresponding to a current one of the pixels and previous data corresponding to at least one of the pixels earlier in the driving order; and compensate the current data based on at least the previous data.

* * * * *